July 23, 1929.                W. VOGEL                1,722,163
                            HIGH TENSION CABLE
                            Filed Aug. 13, 1928
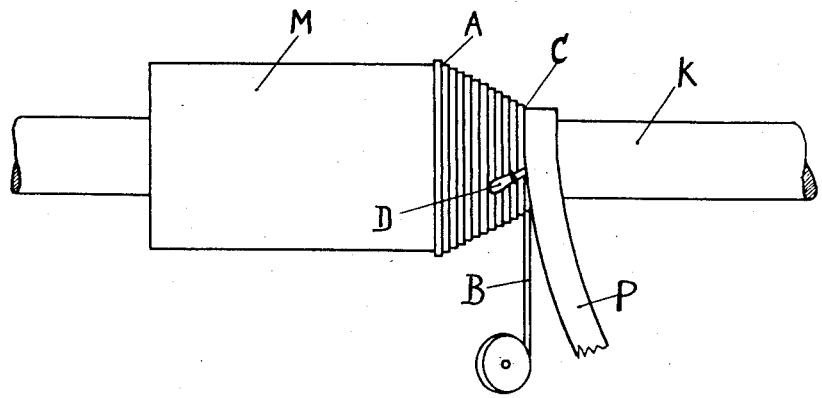
W. Vogel
  INVENTOR
By: Marks & Clerk
        Attys.

Patented July 23, 1929.

1,722,163

UNITED STATES PATENT OFFICE.

WILHELM VOGEL, OF COLOGNE-MULHEIM, GERMANY, ASSIGNOR TO FELTEN & GUILLEAUME CARLSWERK ACTIEN-GESELLSCHAFT, OF COLOGNE-MULHEIM, GERMANY.

HIGH-TENSION CABLE.

Application filed August 13, 1928, Serial No. 299,267, and in Germany August 27, 1927.

The joints in the sleeves for high tension cables have, as is well known, an insulation of considerably greater diameter than the rest of the cable. This can be made by a sheet of paper being wrapped cylindrically over the entire length of the sleeve (1 to 2 meters). The cylinder thus formed must be conically stepped in a uniform manner towards the end, so that its outer covering merges into the insulation of the cable.

The present invention relates to a method of uniformly stepping down the paper insulation of the sleeve in a conical manner without the necessity of providing special mechanical means. For this purpose a metal band, for instance a steel band, of several centimeters width having a sharp edge is used. The width of the band depends on the width of the strip which each layer of paper is to contribute to the conical part of the surface of the insulation. This metal band is wrapped on closely in a helical manner on the cylindrical insulation at the joint, beginning at the place where the cone is to start and being wrapped towards the ends of the sleeve. During the wrapping operation, each outermost layer is raised and is thus cut off by the edges of the metal band.

The accompanying drawing illustrates how the method is carried out. M is the cylindrical part of the insulation at the joint and K is the insulation of the adjoining part of the high tension cable. The helical wrapping of the metal band B commences at the point A and at the moment illustrated in the drawing has progressed as far as the point C. The paper sheet P is guided by being raised, for instance by means of a knife D, against the edge of the metal band and is there cut off. After the conical part has been formed the metal band is unwrapped again.

The present method allows of a stepped cone being formed in the paper insulation in a very rapid and uniform manner without the assistance of any special machine.

What I claim is:

A method of uniformly stepping down the paper insulation of the sleeve in a conical manner in high tension cables and the like, consisting in tightly wrapping a metal band having a sharp edge helically on the cylindrical insulation of the sleeve, commencing at the point where the cone is to start and progressing towards the end of the sleeve, at the same time raising each outermost layer of paper and thus cutting it off by the edge of the metal band, as and for the purpose set forth.

In testimony whereof I affix my signature.

WILHELM VOGEL.